(12) United States Patent
Grant et al.

(10) Patent No.: US 10,860,409 B2
(45) Date of Patent: Dec. 8, 2020

(54) TRACELOG ISOLATION OF FAILED SESSIONS AT SCALE

(71) Applicant: Cisco Technology, Inc., San Jose, CA (US)

(72) Inventors: Clinton John Grant, Artarmon (AU); Avinash Ashok Kumar Chiganmi, Fremont, CA (US); Calvin Michael Hareng, San Francisco, CA (US); Winifred Yah Lee, Huntington Beach, CA (US); Suman Sarkar, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 48 days.

(21) Appl. No.: 16/051,939

(22) Filed: Aug. 1, 2018

(65) Prior Publication Data

US 2020/0042372 A1 Feb. 6, 2020

(51) Int. Cl.
*G06F 11/00* (2006.01)
*G06F 11/07* (2006.01)
*H04L 29/12* (2006.01)
*H04W 84/12* (2009.01)

(52) U.S. Cl.
CPC ........ *G06F 11/079* (2013.01); *G06F 11/0709* (2013.01); *G06F 11/0751* (2013.01); *G06F 11/0778* (2013.01); *H04L 61/2007* (2013.01); *H04L 61/6022* (2013.01); *H04W 84/12* (2013.01)

(58) Field of Classification Search
CPC .. G06F 11/008; G06F 11/079; G06F 11/3409; G06F 11/3452; G06F 11/3604

USPC ........................................................ 714/37
See application file for complete search history.

(56) References Cited

U.S. PATENT DOCUMENTS

| | | | |
|---|---|---|---|
| 7,395,429 B2 * | 7/2008 | Kitani | G11B 20/00086 713/171 |
| 7,975,262 B2 | 7/2011 | Cozmei | |
| 8,863,091 B2 | 10/2014 | Dageville et al. | |
| 10,282,268 B1 * | 5/2019 | Cherian | G06F 11/3082 |
| 2004/0003319 A1 * | 1/2004 | Ukai | G06F 11/0712 714/25 |
| 2004/0236982 A1 * | 11/2004 | Greer | G06F 11/0775 714/2 |

(Continued)

OTHER PUBLICATIONS

Bovenzi, Antonio., "On-line Detection of Anomalies in Mission-critical Software Systems", Submitted in Partial Fulfillment of the Requirements for the Degree of Doctor of Philosophy, 172 pages, Apr. 2013, University of Naples Federico II Via Claudio 21, 80125—Napoli, Italy.

(Continued)

*Primary Examiner* — Sarai E Butler
(74) *Attorney, Agent, or Firm* — Behmke Innovation Group LLC; Kenneth J. Heywood; Jonathon P. Western

(57) ABSTRACT

In one embodiment, a device writes messages and corresponding trace-on-failure flags to log files when failure conditions are detected. The device propagates the trace-on-failure flags to headers of the log files. The device forms a file index of the log files that have trace-on-failure flags set in their headers. The device performs, using the file index, a lookup of messages in the log files associated with a particular error context. The device sends data from the lookup to an electronic display.

20 Claims, 8 Drawing Sheets

(56) References Cited

U.S. PATENT DOCUMENTS

| | | | | |
|---|---|---|---|---|
| 2007/0127385 | A1* | 6/2007 | Yasuie | H04L 12/462 370/242 |
| 2009/0049428 | A1* | 2/2009 | Cozmei | G06F 11/3636 717/128 |
| 2010/0329573 | A1* | 12/2010 | Tsujino | G09G 3/006 382/209 |
| 2011/0296255 | A1* | 12/2011 | Watkins | G06F 11/0724 714/54 |
| 2012/0260141 | A1* | 10/2012 | Bhagwan | H04L 41/0636 714/732 |
| 2017/0150331 | A1* | 5/2017 | Van Snellenberg | H04L 9/3239 |
| 2017/0195133 | A1* | 7/2017 | Salgueiro | H04L 67/146 |
| 2019/0188091 | A1* | 6/2019 | Christiansen | G06F 3/0613 |
| 2019/0268267 | A1* | 8/2019 | Pignataro | H04L 45/741 |

OTHER PUBLICATIONS

Santos, Tim dos., "New approaches in user-centric job monitoring on the LHC Computing Grid", Dissertation, 152 pages, Jul. 25, 2011, Fachbereich C—Fachgruppe Physik Bergische Universitat Wuppertal.

"Cisco IOS XE 16: Secure, Open, and Flexible", At a glance—Cisco public, https://www.cisco.com/c/dam/en/us/products/collateral/ios-nx-os-software/ios-xe/nb-09-ios-xe-secure-open-flex-aag-cte-en.pdf, 4 pages, 2018, Cisco.

"Open Source Search & Analytics", https://www.elastic.co/, 2 pages, Accessed on Apr. 25, 2018, Elasticsearch.

"Problem Determination", Version 4.2, WebSphere Voice Response for AIX with DirectTalk Technology, Sixth edition (Aug. 2008), pp. 1-479, 2008, International Business Machines Corporation.

"Splunk", https://www.splunk.com/, 4 pages, Accessed on Apr. 25, 2018, Splunk Inc.

* cited by examiner

TRACELOG ISOLATION OF FAILED SESSIONS AT SCALE

TECHNICAL FIELD

The present disclosure relates generally to computer networks, and, more particularly, to tracelog isolation of failed sessions at scale.

BACKGROUND

As computer networks continue to increase in size, the volume of event logs generated by the networking devices in the network can be quite large. For example, current wireless controllers can scale to approximately 150,000 users. In another example, some broadband platforms now support up to 100,000 users. In such devices, information may be captured about the individual sessions. When a particular user session fails, isolating the tracelog information for the failed session from among the large volume of logs can become very cumbersome due to the number, size, and distribution of the logs. In other words, isolating the tracelog information for a particular failed session can be like hunting for a needle in a haystack.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
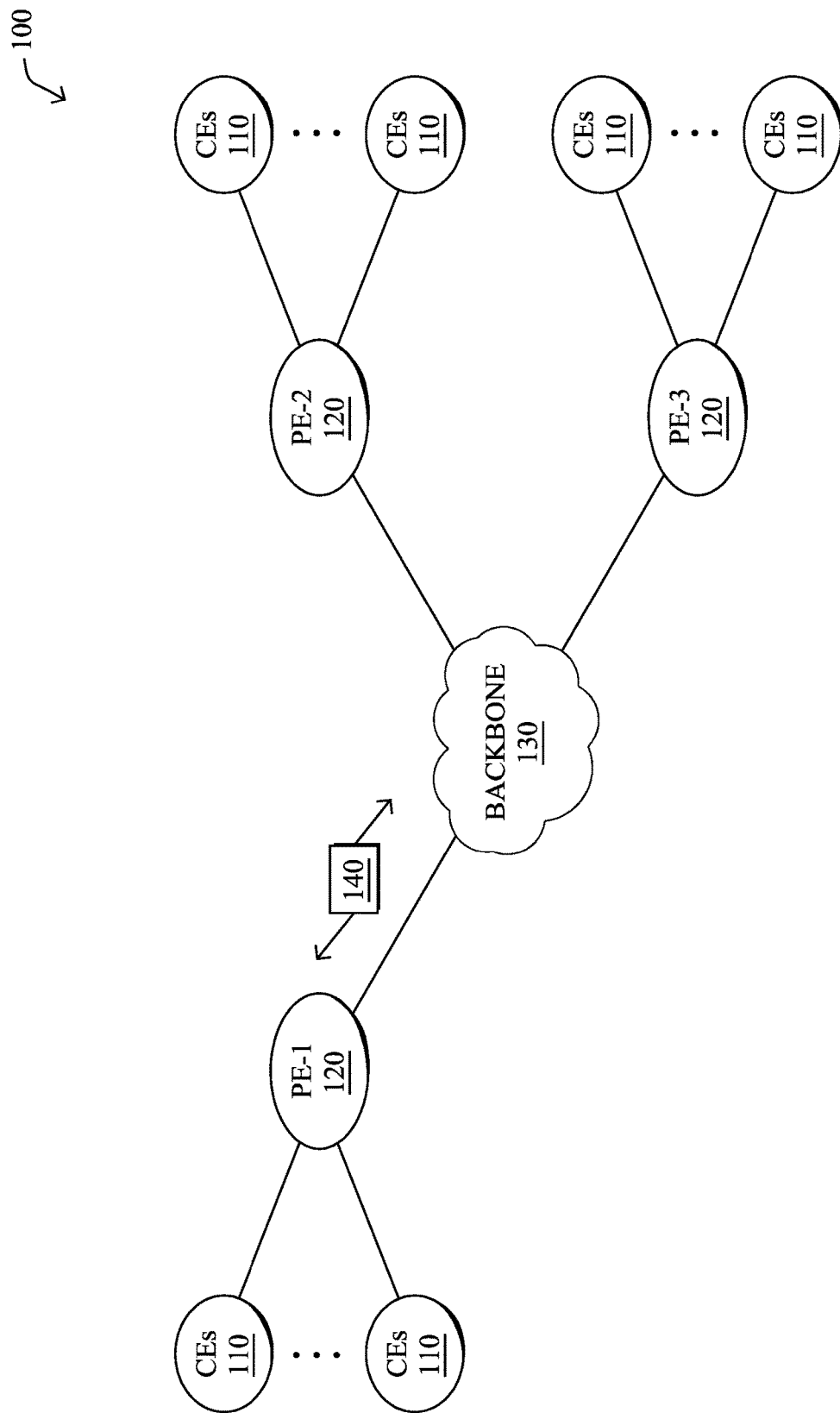
FIGS. 1A-1B illustrate an example communication network.

According to one or more embodiments of the disclosure, a device writes messages and corresponding trace-on-failure flags to log files when failure conditions are detected. The device propagates the trace-on-failure flags to headers of the log files. The device forms a file index of the log files that have trace-on-failure flags set in their headers. The device performs, using the file index, a lookup of messages in the log files associated with a particular error context. The device sends data from the lookup to an electronic display.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
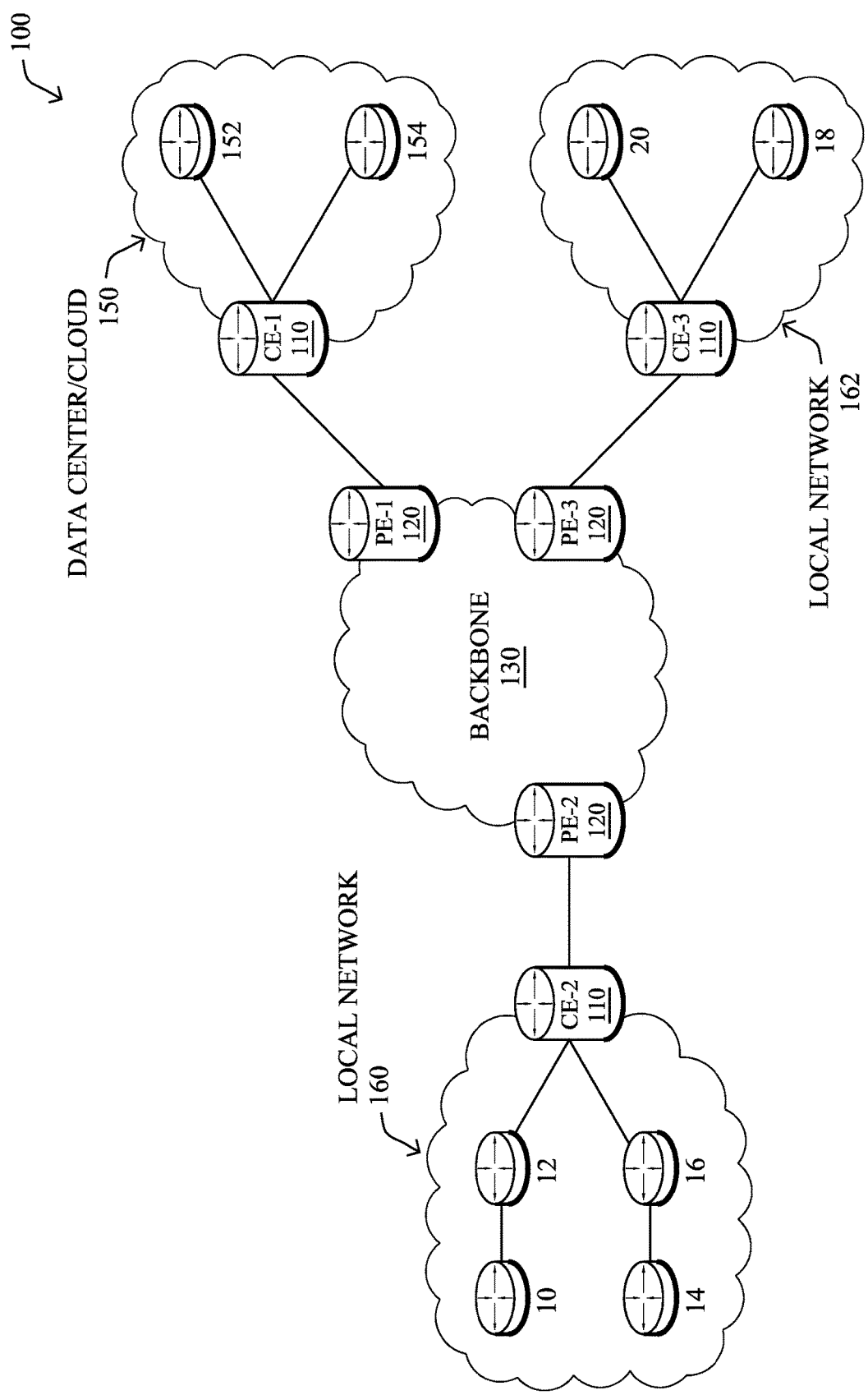

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
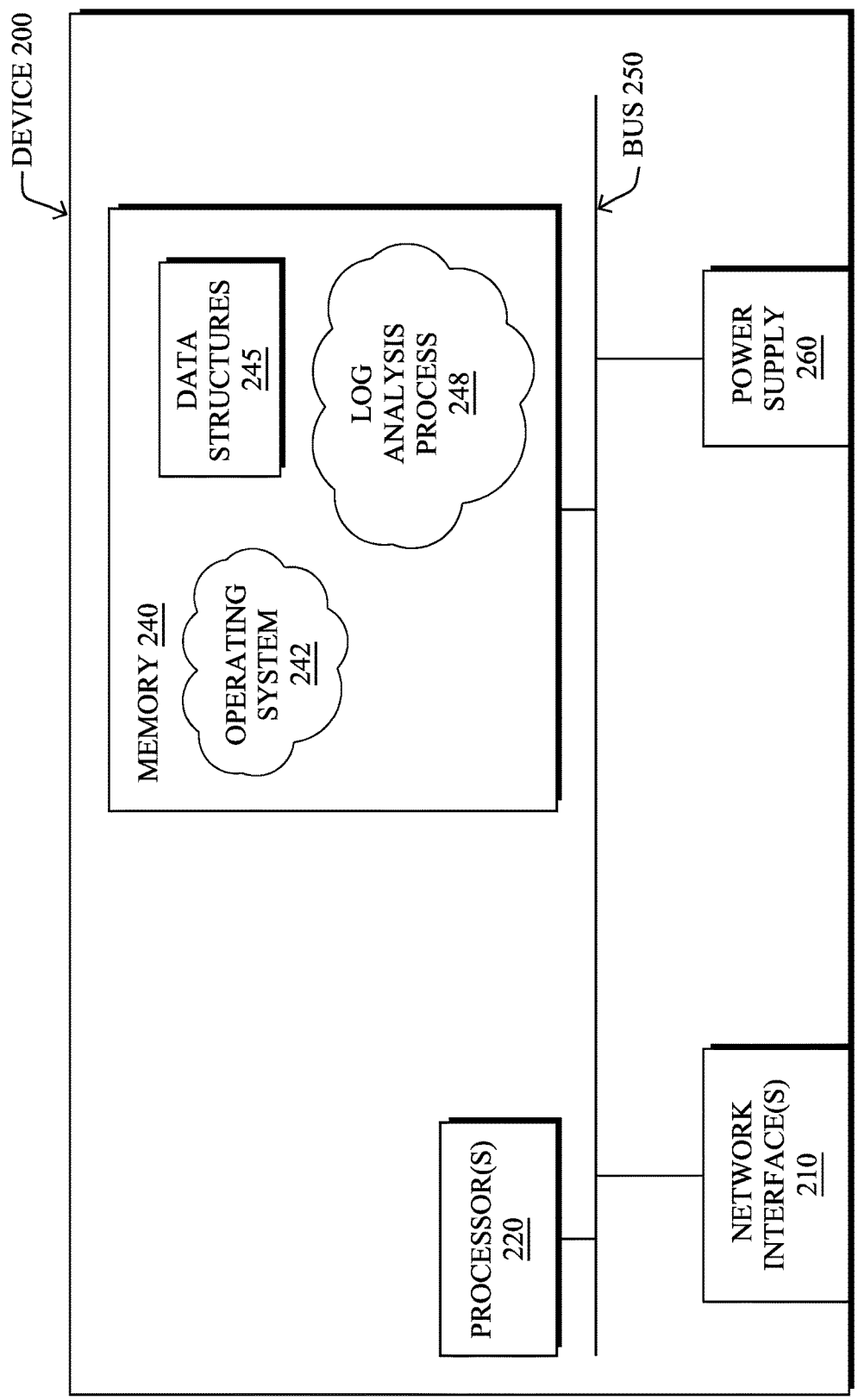
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a log analysis process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, the challenge with modern networking devices (e.g., routers, switches, wireless LAN controllers, etc.) that are capable of logging at a very high scale is that it can be difficult to isolate the failure logs of interest. Notably, modern wireless LAN controllers will soon support up to 150,000 users and broadband platforms will soon support up to 100,000 users. Such networking devices are capable of storing tens, or even hundreds, of gigabytes of logs, locally. This means that isolating log information for a particular failed session from among the large volume of logs can become quite challenging.

One potential approach to supporting the large volume of log data in a network would be to send the tracelogs from the individual devices to a central repository, convert the logs to ASCII or other form of text, and produce a keyword style index. However, doing so would also increase the overhead on the network, to transfer the logs from the networking devices to the repository. In other words, the data collection itself may reduce the available bandwidth in the network for In addition, such an offline approach means there will be a time delay between when an error occurs (e.g., a failed session) and when information regarding the error can be retrieved from the network.

Tracelog Isolation of Failed Sessions at Scale

The techniques herein allow for fast and efficient isolation of session-oriented failure logs from among a large corpus of event logs. In some aspects, the techniques herein apply run-time annotation of metadata by the application code to the tracelogs and apply on-device file indexing, to support session-level log queries.

Specifically, according to one or more embodiments of the disclosure as described in detail below, a device writes messages and corresponding trace-on-failure flags to log files when failure conditions are detected. The device propagates the trace-on-failure flags to headers of the log files. The device forms a file index of the log files that have trace-on-failure flags set in their headers. The device performs, using the file index, a lookup of messages in the log files associated with a particular error context. The device sends data from the lookup to an electronic display.

Illustratively, the techniques described herein may be performed by hardware, software, and/or firmware, such as in accordance with the log analysis process 248, which may include computer executable instructions executed by the processor 220 (or independent processor of interfaces 210) to perform functions relating to the techniques described herein.

Operationally, the techniques herein introduce a file indexing approach that can be used in conjunction with the trace-on-failure (ToF) functionality of a networking device. Such functionality may employ binary tracing and/or radioactive tracing capabilities of the device. In particular, in various embodiments, when a terminal error condition is flagged in the code by the application writer of the device at the message level, this information may be propagated to the metadata in the log file header. By doing so, this reduces the problem to one of locating tracelog files with trace-on-failure errors, not finding the error tracelog itself. This has the effect of reducing the search space by 3-4 orders of magnitude, if each tracelog file per daemon includes approximately 10,000 tracelogs. By forming an index of those marked log files on disk, queries for specific error contexts (e.g., a particular MAC or IP address, etc.) can be simplified and performed on-device.

According to various embodiments, the techniques herein leverage the following components:

Binary Tracing (Btrace)—this allows for the association of metadata with each tracelog file, and each tracelog message itself. Since it is binary, the software is not reduced to complex and expensive regex operations to find information, but can instead rely on the structure provided by the metadata. Note that Btrace allows for each daemon to produce its own set of tracelog files.

Radioactive Tracing—this allows for an error context, such as a MAC address, IP address, etc. for an application session to be associated with a set of logs, without explicitly being written into each log. Btrace flags can be associated with each Btrace log message, to signal the start of a new session (e.g., TOF_start and a terminal error state TOF_err (trace-on-failure error)).

BTMAN Btrace Manager Daemon—this daemon is responsible for rotating the Btrace files written to a temporary in-memory file system into more permanent disk storage on the networking device. In various embodiments, this daemon also inspects the Btrace file headers for ToF error flags, in order to construct and maintain a ToF file index of the log files that include ToF errors.

The application writer of the networking device may use a TOF_err flag to annotate the terminal error states of the session state machines of the device. For example, the application writer may annotate a terminal session failure state similar to the following error message:

ERR((_btTOF_err), "% s: Client session Roam failure-user % s . . . ",

As would be appreciated, the networking device may offer a user interface, to allow a network administrator to query and view the information stored in the logs. For example, many networking devices offer a command line interface (CLI) that allows the user to enter text-based commands, to view historical information about the device and make configuration changes to the device. In various embodiments, the user interface of the networking device may offer two views. The first view may be a summary listing of the trace-on-failure errors carried into the index maintained by the BTMAN Btrace Manager Daemon. The second view may be a CLI-based "show" command that allows the user to extract out the tracelogs that preceded the session error, and stops with the session error for the entered context, such as a particular MAC address. Essentially, the system may return the filtered logs that preceded the error for a window of time. For example, the following CLI commands may be used:

show logging trace-on-failure summary
show logging trace-on-failure context [mac lip|string]

As would be appreciated, most log analysis solutions today involve creation of a log index after the logs are taken from the device and fed into a tool like Splunk, ElasticSearch (ELK stack), or the like. However, none of these approaches are actively integrated with the applications producing the logs.

Figure 3A:
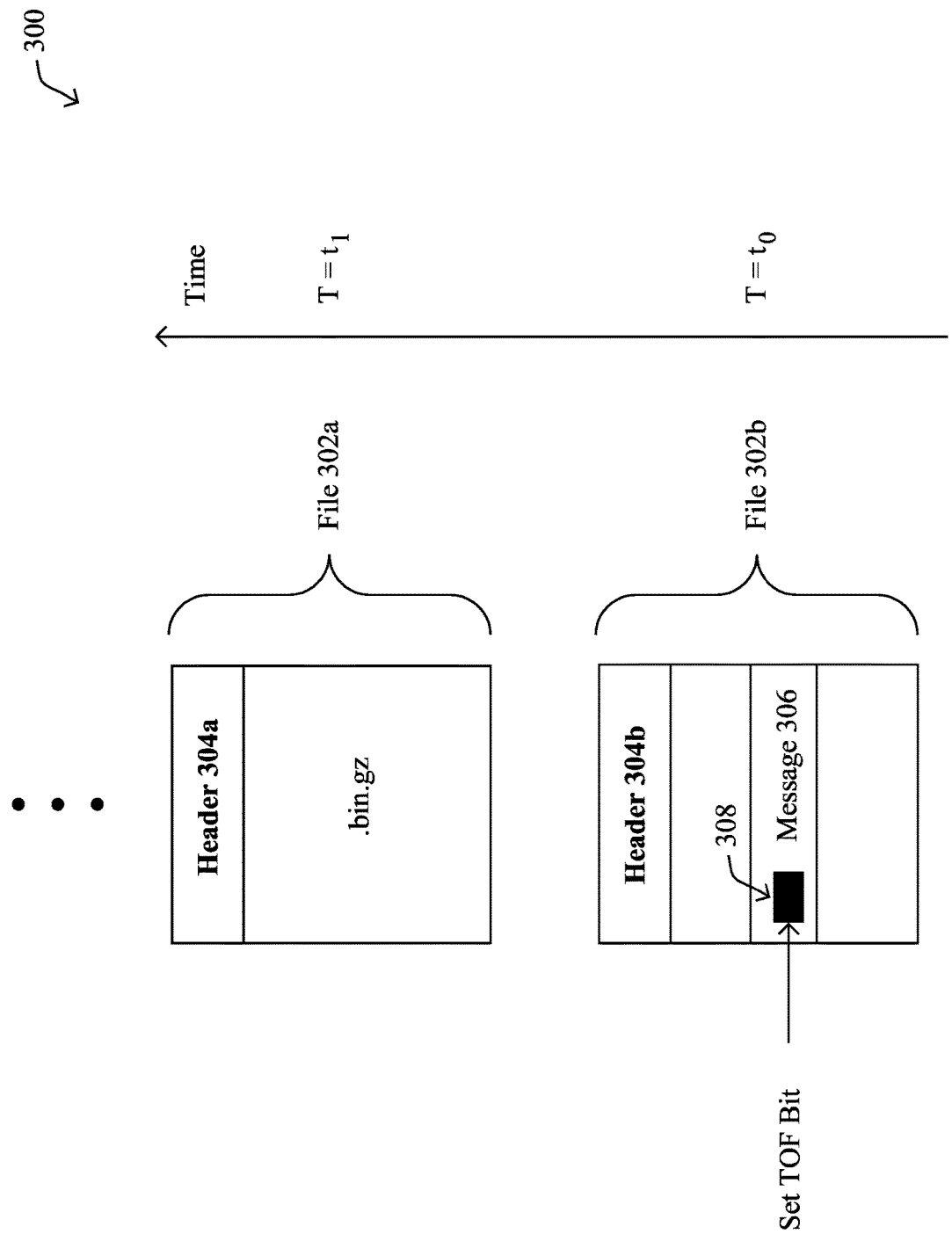
FIGS. 3A-3B illustrate examples of adding a trace-on-failure message to a log.
Figure 3B:
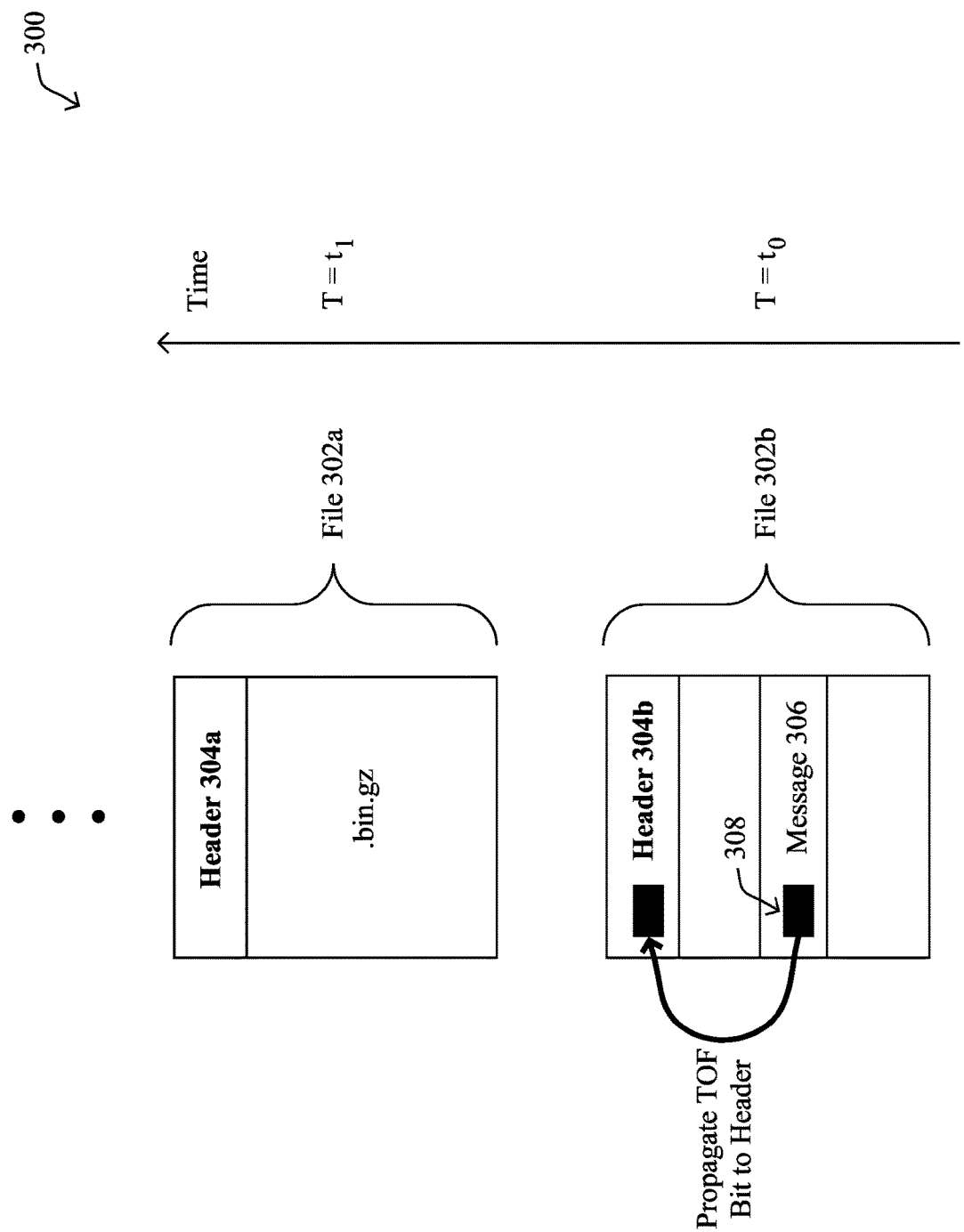

FIGS. 3A-3B illustrate examples of adding a trace-on-failure message to a log, according to various embodiments. As shown in example 300 in FIG. 3A, assume that the networking device generates log files 302 over time. For example, at time T=$t_0$, the device may generate log file 302b, at time T=$t_1$, the device may generate log file 302a, etc. In addition, log files 302 may be in a compressed form, such as a .bin.gz format or other compressed format.

During operation, the device may write tracelog messages to the current log file 302. These messages may generally include information about the current state of the networking device, such as session information for the various traffic flows passing through the networking device. In a typical implementation today, each log file 302 may be of 1 Mb in size and include approximately 10,000 tracelog messages. However, as would be appreciated, any file size and/or number of tracelog messages per file may be used with the techniques herein, as desired. A subset of these messages may be trace on failure messages that are generated whenever an error occurs. For example, when a particular session fails, a trace on failure message 306 may be written to log file 302b.

In various embodiments, a Btrace flag may be used to annotate a specific message within a log file 302. For example, the following Btrace flags can be added to a tracelog message, to distinguish certain messages:

btTOF_err—trace on failure error
btTAC (btCU)—customer facing/curated tracelog
btDev—developer only tracelog Specifically, assume that message 306 shown in FIG. 3A is a TOF message. In such a case, a TOF error flag 308 (e.g., a btTOF_err flag) may be associated with message 306. According to various embodiments, TOF error flag 308 may also be propagated to the Btrace file header 304b of log file 302b to which TOF message 306 is written, as shown in FIG. 3B. By explicitly marking the header 304 of a log file 302 with a TOF error flag 308 to signify that the file includes a TOF error message, a search query for TOF errors for a specified context, such as for a specified MAC or IP address, will only need to search a reduced set of log files 302.

Figure 4:
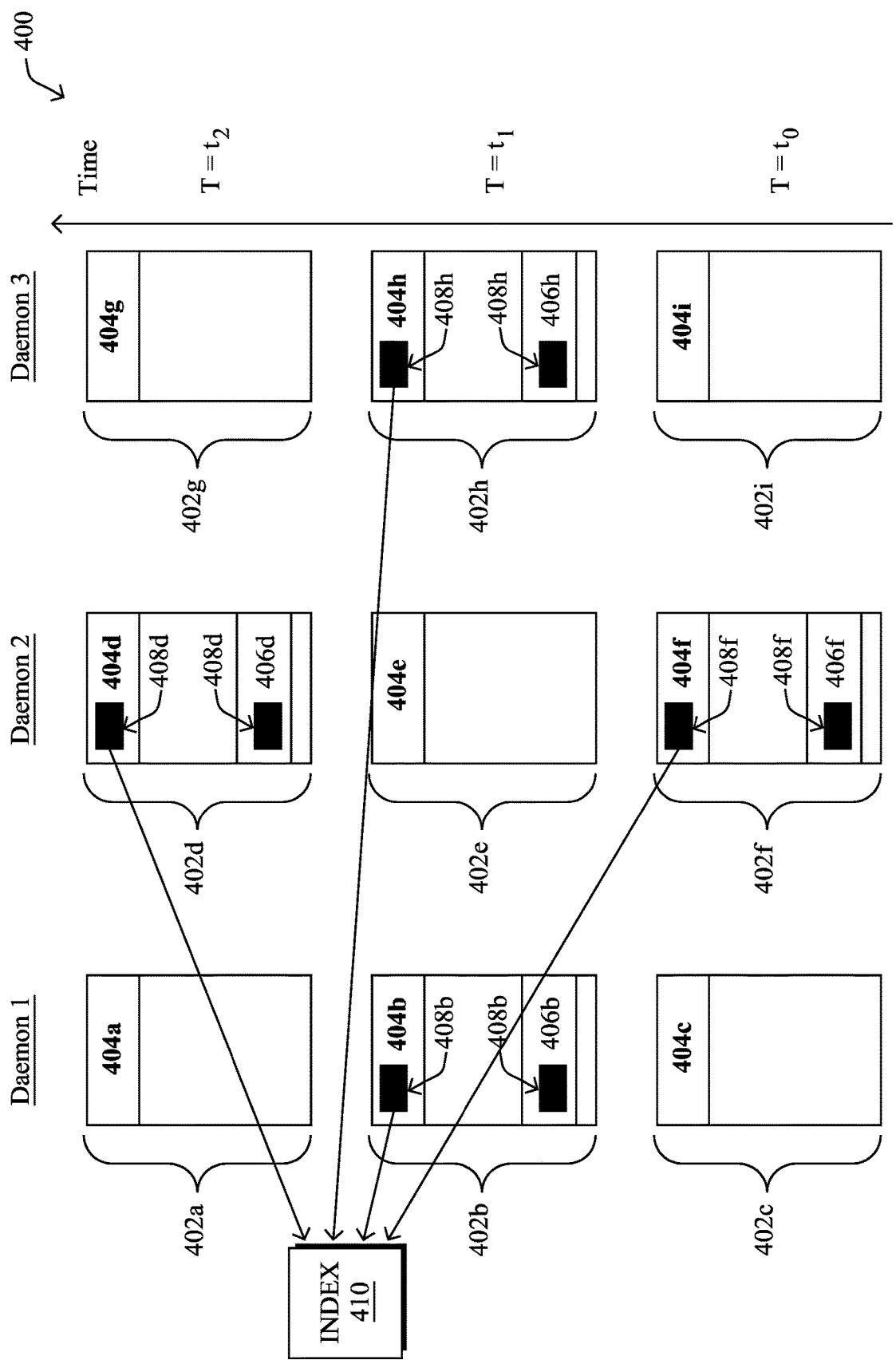
FIG. 4 illustrates an example of indexing log files.

FIG. 4 illustrates an example 400 of indexing log files 402, according to various embodiments. As noted above, the networking device may move log files 402 from a temporary file system (e.g., TMPFS) to persistent disk storage, when the log file 402 reaches its size limit. For example, this limit is typically 1 Mb in many modern networking devices today. Over time, each application daemon (e.g., daemon 1, daemon 2, daemon 3, etc.) may generate log files 402 that will eventually need to be moved to persistent storage. For example, daemon 1 may generate log file 402c at time T=$t_0$, daemon 2 may generate log file 402f at time T=$t_1$, etc.

In some embodiments, the application daemon generating log files may link to libbtrace, which allows them to write binary tracelog files 402 to the TMPFS under/tmp or another designated temporary file system of the networking device. When a particular log file 402 reaches its size limit (e.g., 1 Mb, etc.), the BTMAN daemon may handle the rotation of the log file 402 from the TMPFS to the persistent disk storage.

According to various embodiments, when the BTMAN rotates a given log file 402 from the temporary file system to persistent storage, it may also inspect the header 404 of the log file 402 for a TOF error flag 408. In turn, the BTMAN may generate and maintain an index 410 of those stored log files 402 that have a set TOF error flag 408 set in its header 404. For example, assume that log files 402b, 402d, 402f, and 402h each include at least one TOF error message 406 (e.g., messages 406b, 406d, 406f, and 406h, respectively). Using the approach detailed with respect to FIGS. 3A-3B, TOF error flags 408 may be propagated to the headers 404 of these log files 402. For example, header 404b of log file 402b may have a TOF error flag 408b set, due to log file 402b including TOF error message 406b, etc.

Through analysis of the header 404 of a log file 402, when the log file 402 is rotated from the temporary file system (e.g., due to the file reaching its size limit) to the persistent memory of the networking device, it can be added to index 410 if its header 404 includes a TOF error flag 408. Thus, index 410 indexes a reduced subset of the full set of generated log files 402, limited only to those log files 402 that include at least one TOF error message 406. For example, as shown, log files 402a, 402c, 402e, 402g, and 402i do not include TOF error messages and, consequently, do not have TOF error flags 408 set in their respective headers 404. Conversely, as log files 402b, 402d, 402f, and 402h include TOF error messages 406b, 406d, 406f, and 406h, respectively, they may be added to index 410 based on their respective headers 404 having the TOF error flag 408 set.

Figure 5:
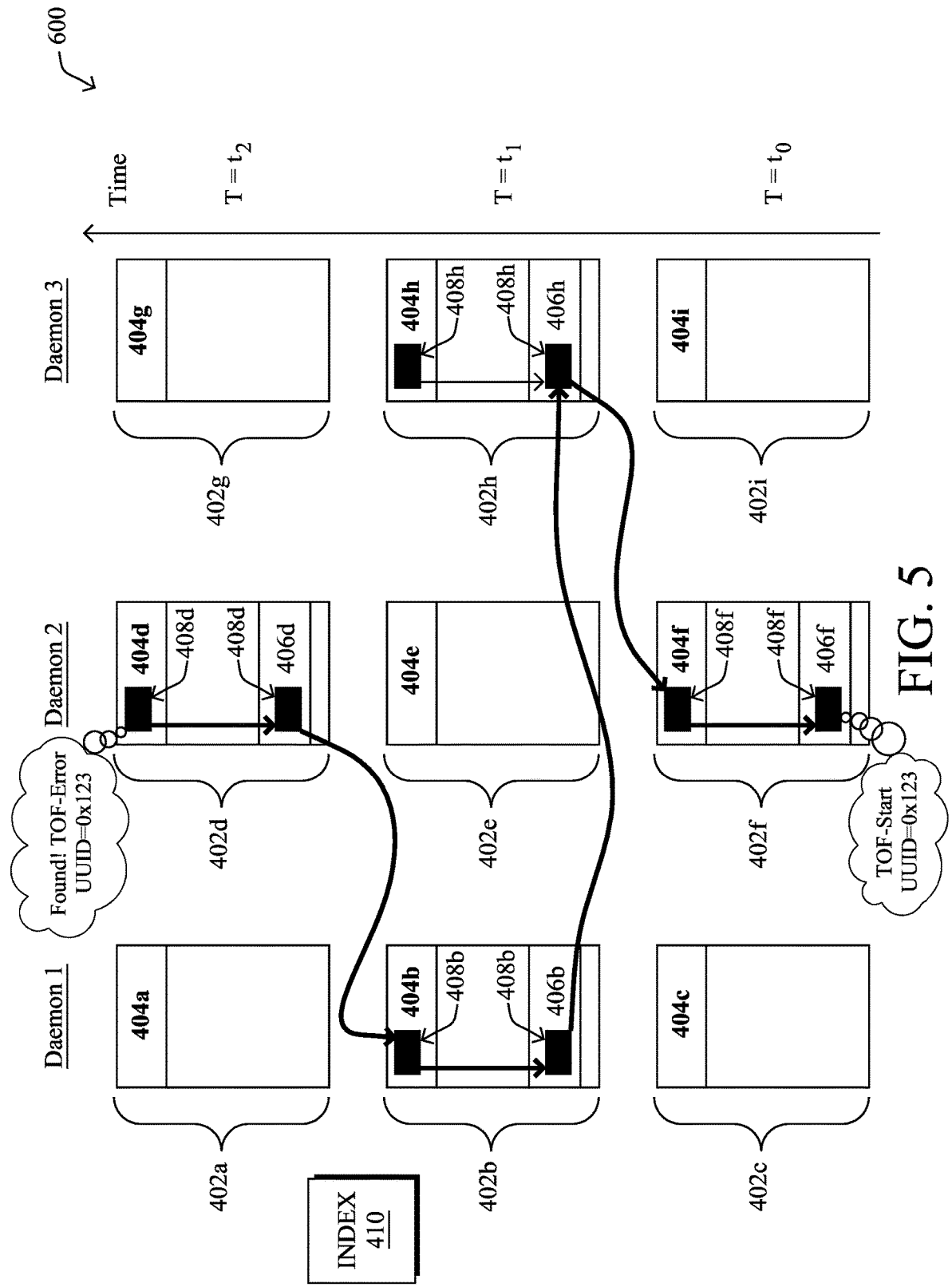
FIG. 5 illustrates an example of performing a context query among log files.

FIG. 5 illustrates an example 500 of performing a context query among log files, according to various embodiments. Continuing the example of FIG. 4, assume that the log files 402 shown have been moved into persistent storage on the networking device and those with TOF error flags 408 set in their headers 404 added to index 410.

When a user wishes to view the detailed traces that resulted in the terminal TOF error state for a specified application context, the search query may proceed by walking through index 410 to find the most recent TOF failure message for the context specified in the query. This involves opening the log files 402 and finding the message 406 with the TOF error flag 408 set. In turn, the UUID of this message 406 is checked to see whether it correlates to the specified context from the query. For example, index 410 may indicate that log file 402d includes a TOF error message (e.g., message 406d). During the query search, the device may read log file 402d and see whether the UUID of message 406d matches the specified context of the query. If so, the device may provide message 406d to the user interface for display.

In some embodiments, a TOF query for a particular context may also evaluate older log files 402, looking for other TOF errors associated with the context specified in the query. For example, as shown, the query may also read log files 402b, 402h, and 402f, walking backwards in time, to see whether each of these log files include a TOF error message 406 associated with the context specified in the query. In one embodiment, this historical query may be limited to a certain time period (e.g., the last 5 minutes, etc.). To support this, metadata in headers 404 may also track the start and end times for all messages in the file 404, helping to facilitate this walk.

Note that the traces corresponding to the specified context may span log files 402 from many different daemons. Thus, even though log files 402b and 402h are generated by different daemons, the query may identify their constituent TOF error messages 406b and 406h as both relating to the specified context for the query. In turn, the discovered TOF error messages 406d, 406b, 406h, and 406f for the specified context that occurred within the search time window may be sent to the user interface for display to the user. For example, this may allow the user to view all of the TOF error messages 406 associated with a specific MAC address within the last five minutes, to better evaluate why these errors occurred.

Figure 6:
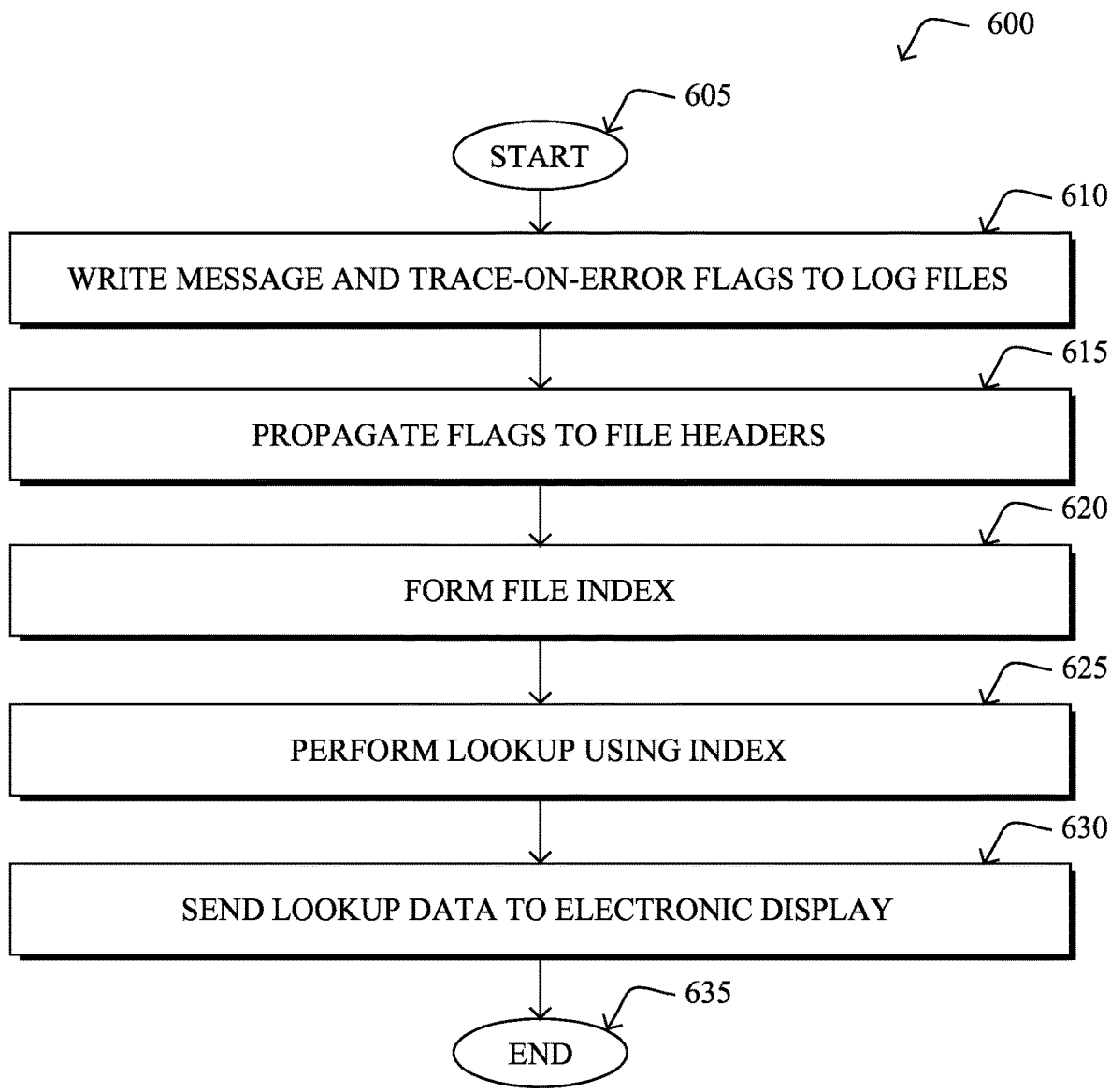
FIG. 6 illustrates an example simplified procedure for performing a log query.

FIG. 6 illustrates an example simplified procedure for performing a log query, in accordance with one or more embodiments described herein. For example, a non-generic, specifically configured device (e.g., device 200) may perform procedure 600 by executing stored instructions (e.g., process 248). The device may be, in various embodiments, a networking device, such as a network switch, router, wireless LAN controller, or any other networking device through which network traffic flows. The procedure 600 may start at step 605, and continues to step 610, where, as described in greater detail above, the device may write messages and corresponding trace-on-failure flags to log files when failure conditions are detected. For example, if a particular application session fails, the networking device may write a trace on failure (TOF) message regarding the failure to a log file, with a corresponding TOF flag set.

At step 615, as detailed above, the device may propagate the trace-on-failure flags associated with the messages to headers of the log files. In particular, if a TOF error message is written to a given log file, the device may set a TOF error flag in the metadata header of the log file. By doing so, the TOF error flag set in the header indicates that the log file includes at least one TOF error message. As would be appreciated, not all log files will include such messages and only a subset of the full set of log files will have this flag set in their headers.

At step 620, the device may form a file index of the log files that have trace-on-failure flags set in their headers, as described in greater detail above. In some embodiments, the device may add a given log file to the index, when moving the log file from a temporary storage location (e.g., TMPFS, etc.) to persistent memory. Notably, the daemon responsible for rotating a log file that has reached its size limit to persistent memory may also inspect the header of the file during the move process. If the file includes a TOF error flag, as set in step 615, the daemon of the device may add the log file to the index. As a result, the index will index only those log files that include TOF error messages, thereby reducing the search space for TOF-related queries.

At step 625, as detailed above, the device may perform, using the file index from step 620, a lookup of messages in the log files associated with a particular error context. Such an error context may be, for example, a specified MAC address, IP address, or the like. In some embodiments, the device may perform the query by searching through those log files identified in the index, and determining whether the log files include a TOF error message associated with the specified context. The query may also span log files generated by different monitoring daemons, thereby allowing the device to correlate TOF messages associated with the context across the log files from the different daemons, based on the messages being associated with the particular error context. In some cases, the query may also be limited to a predefined time period. In such cases, the device can leverage file header metadata that specifies the time period of the constituent messages in the file, to limit which log files are actually searched for the specified context.

At step 630, the device may send data from the lookup to an electronic display, as described in greater detail above. For example, the device may send the TOF error messages found during the query for the specified context to a CLI-based interface for review by a network administrator. Procedure 600 then ends at step 635.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for tracelog isolation of failed sessions, it is to be understood that various other adaptations and modifications may be made within the spirit and scope of the embodiments herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:
1. A method comprising:
writing, by a device, messages and corresponding trace-on-failure flags to log files when failure conditions are detected;
propagating, by the device, the trace-on-failure flags to headers of the log files by employing binary tracing to associate the headers of the log files to each trach-on-failure flag;
forming, by the device, a file index of the log files that have trace-on-failure flags set in their headers;

performing, by the device and using the file index, a lookup of messages in the log files associated with a particular error context by employing radioactive tracing; and sending, by the device, data from the lookup to an electronic display.

2. The method as in claim 1, wherein the particular error context comprises at least one of: a media access control (MAC) address or an Internet Protocol (IP) address.

3. The method as in claim 1, wherein the device is a network switch or a network router.

4. The method as in claim 1, wherein sending the data from the lookup to the electronic display comprises:
sending the data from the lookup to a command line interface for display.

5. The method as in claim 1, wherein forming the file index of the log files that have trace-on-failure flags set in their headers comprises:
moving a particular one of the log files from a temporary storage location to a permanent storage location;
identifying the particular log file as having a trace-on-failure flag set in the header of the particular log file, when moving the particular log file; and
adding the particular log file to the file index based on the identified trace-on-failure flag set in the header of the particular log file.

6. The method as in claim 1, wherein two or more of the log files are generated by different daemons.

7. The method as in claim 6, wherein performing the lookup of messages in the log files associated with a particular error context comprises:
correlating messages associated with the particular error context across the log files from the different daemons, based on the messages being associated with the particular error context.

8. The method as in claim 1, wherein the device is a wireless local area network controller.

9. The method as in claim 1, wherein the log files are stored locally by the device.

10. An apparatus, comprising:
one or more network interfaces to communicate with a network;
a processor coupled to the one or more network interfaces and configured to execute a process; and
a memory configured to store the process executable by the processor, the process when executed configured to:
write messages and corresponding trace-on-failure flags to log files when failure conditions are detected;
propagate the trace-on-failure flags to headers of the log files by employing binary tracing to associate the headers of the log files to each trach-on-failure flag;
form a file index of the log files that have trace-on-failure flags set in their headers;
perform, using the file index, a lookup of messages in the log files associated with a particular error context by employing radioactive tracing; and
send data from the lookup to an electronic display.

11. The apparatus as in claim 10, wherein the particular error context comprises at least one of: a media access control (MAC) address or an Internet Protocol (IP) address.

12. The apparatus as in claim 10, wherein the apparatus is a network switch or a network router.

13. The apparatus as in claim 10, wherein the apparatus sends the data from the lookup to the electronic display by:
sending the data from the lookup to a command line interface for display.

14. The apparatus as in claim 10, wherein the apparatus forms the file index of the log files that have trace-on-failure flags set in their headers by:
moving a particular one of the log files from a temporary storage location in the memory to a permanent storage location in the memory;
identifying the particular log file as having a trace-on-failure flag set in the header of the particular log file, when moving the particular log file; and
adding the particular log file to the file index based on the identified trace-on-failure flag set in the header of the particular log file.

15. The apparatus as in claim 10, wherein two or more of the log files are generated by different daemons.

16. The apparatus as in claim 15, wherein the apparatus performs the lookup of messages in the log files associated with a particular error context by:
correlating messages associated with the particular error context across the log files from the different daemons.

17. The apparatus as in claim 10, wherein the apparatus is a wireless local area network controller.

18. The apparatus as in claim 10, wherein the log files are stored locally by the apparatus.

19. A tangible, non-transitory, computer-readable medium storing program instructions that cause a device in a network to execute a process comprising:
writing, by the device, messages and corresponding trace-on-failure flags to log files when failure conditions are detected;
propagating, by the device, the trace-on-failure flags to headers of the log files by employing binary tracing to associate the headers of the log files to each trach-on-failure flag;
forming, by the device, a file index of the log files that have trace-on-failure flags set in their headers;
performing, by the device and using the file index, a lookup of messages in the log files associated with a particular error context by employing radioactive tracing; and
sending, by the device, data from the lookup to an electronic display.

20. The computer-readable medium storing program instructions as in claim 19, wherein the particular error context comprises at least one of: a media access control (MAC) address or an Internet Protocol (IP) address.

* * * * *

UNITED STATES PATENT AND TRADEMARK OFFICE
CERTIFICATE OF CORRECTION

PATENT NO. : 10,860,409 B2  
APPLICATION NO. : 16/051939  
DATED : December 8, 2020  
INVENTOR(S) : Clinton John Grant Page 1 of 1

It is certified that error appears in the above-identified patent and that said Letters Patent is hereby corrected as shown below:

In the Specification

Column 7, Line 23, please amend as shown:
show logging trace-on-failure context [mac |ip | string]

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*